(No Model.)
M. R. COLVIN.
CASING FOR PIPES AND TUBES.
No. 369,773. Patented Sept. 13, 1887.
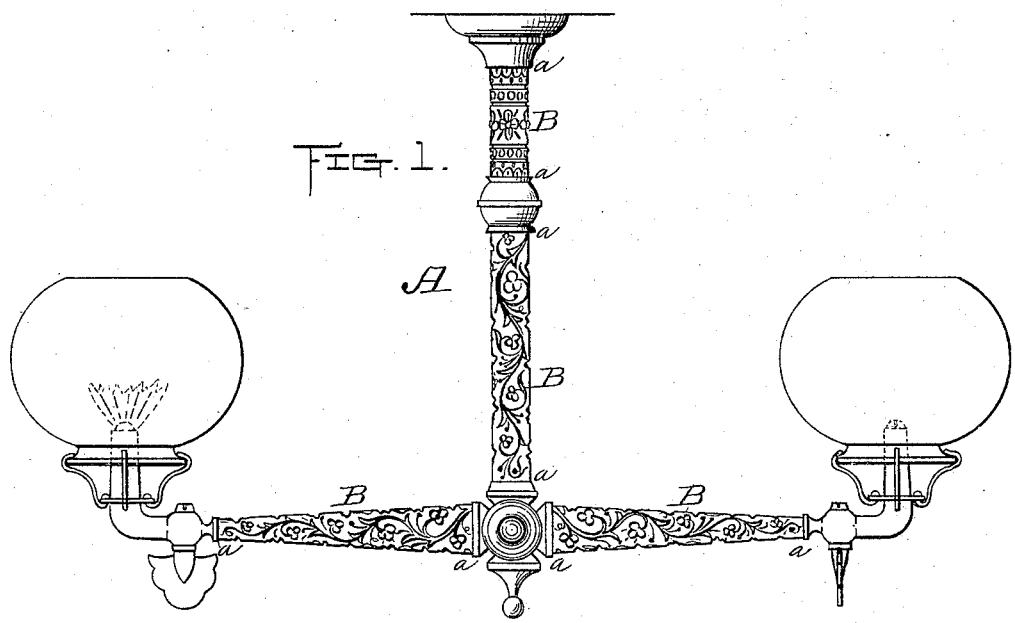
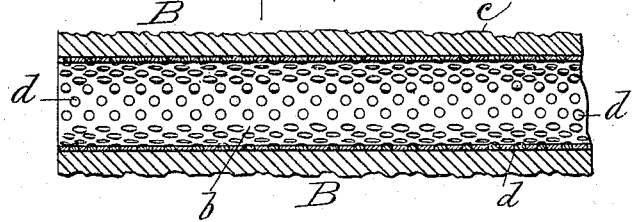
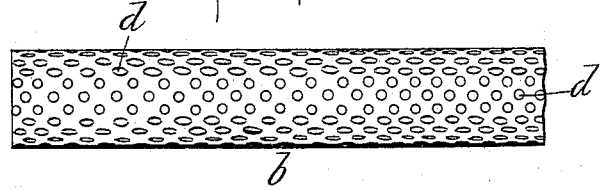
Witnesses:
Walter B. Nourse.
Lucius W. Briggs.
Inventor:
Michael R. Colvin.
By A. A. Barker, Att'y.

UNITED STATES PATENT OFFICE.

MICHAEL R. COLVIN, OF WORCESTER, MASSACHUSETTS.

CASING FOR PIPES AND TUBES.

SPECIFICATION forming part of Letters Patent No. 369,773, dated September 13, 1887.

Application filed November 10, 1886. Serial No. 218,447. (No model.)

*To all whom it may concern:*

Be it known that I, MICHAEL R. COLVIN, of Worcester, in the county of Worcester and State of Massachusetts, have invented certain new and useful Improvements in Casings for Pipes and Tubes; and I do hereby declare that the following is a full, clear, and exact description of the same, reference being had to the accompanying drawings, forming a part of this specification, and in which—

Figure 1 represents an ordinary gas-fixture provided with my aforesaid improved casings. Fig. 2 is a central longitudinal section through a piece of casing made in accordance with my invention, and Fig. 3 is a side view of a perforated tube such as is employed in the construction of said casing.

My invention relates more especially to casings for the ornamentation of gas-fixtures and lamps of various kinds, but may be used for other purposes where an ornamental pipe, tube, or other surface is desired.

It consists in making said casing of composition suitable for the purpose over a proper supporting inner tube, and forming upon the surface thereof an embossed or figured groundwork of any desired design, covered with a coat of bronzing or similar substance to produce an imitation of any desired metal.

It also consists in the combination of an ornamental casing, made as above specified, with a gas-fixture, lamp, or other article which may be provided with an ornamental outer casing or covering, substantially as hereinafter set forth.

To enable others skilled in the art to which my invention appertains to make and use the same, I will now proceed to describe it more in detail.

In the drawings, the part marked A represents an ordinary two-lighted gas-fixture or chandelier provided with my improved casings B over the vertical part and horizontal arms thereof, said casings being fitted over the usual gas-conducting pipes between the shoulders *a* in like manner to the usual brass tube-casings employed for the same purpose.

My improved casing or covering B consists of an internal supporting-tube, *b*, and the outer shell or main covering, *c*. Said outer covering is preferably made of a composition consisting of whiting, glue, rosin, and oil, being similar and mixed in like proportions to the composition at present largely used in the manufacture of picture-frames. In making said casing B the tube *b* is coated with the composition when in a soft or pliable state, and then compressed by means of suitable molds, so as to produce an embossed or figured surface, such as shown in Fig. 1, or of any other desired design.

The adhesion of the composition to the supporting-tube *b* is facilitated by making perforations *d* therein, as shown in Fig. 3, of any desired shape, or by forming a rough surface thereon in any convenient manner. Said tube is preferably made of metal; but I do not limit myself thereto, as pasteboard or other similar material may be used in lieu thereof with good effect.

After the case B has been formed as aforesaid, it may be further ornamented by covering its surface with bronzing or any other suitable liquid coating for producing an imitation of any desired metal or other material. Therefore it is obvious that any of the costly metals may be imitated in an innumerable variety of ornamental forms and designs at a great reduction in cost, the effect produced by the imitation being nearly or quite equal to that of the real article, and in most instances being equally efficient as regards strength and durability, as the uses to which said casings are designed to be put does not render them liable to breakage or other damage. Consequently strength does not constitute an essential quality in their construction. If desired, the surface of casing B may be painted in different colors, instead of coated, as hereinbefore specified.

Having described my invention, what I claim therein as new, and desire to secure by Letters Patent, is—

1. A casing for gas pipes and tubes comprising, in combination, an inner supporting-tube and an outer coating or covering of composition having an embossed ornamental outer surface, substantially as shown and specified.

2. A casing consisting of an inner supporting-tube and an outer coating or covering of composition having an embossed ornamental outer surface, in combination with a gas-fixture or similar article, substantially as shown and specified.

MICHAEL R. COLVIN.

Witnesses:
ALBERT A. BARKER,
LUCIUS W. BRIGGS.